United States Patent Office 3,787,441
Patented Jan. 22, 1974

3,787,441
SULTONE RECOVERY
Carl D. Kennedy, Claude D. Butler, Delmar D. Krehbiel, and Gene E. Nicks, Ponca City, Okla., assignors to Continental Oil Company, Ponca City, Okla.
No Drawing. Filed May 3, 1971, Ser. No. 139,910
Int. Cl. C07d 89/06, 89/12
U.S. Cl. 260—327 S
4 Claims

ABSTRACT OF THE DISCLOSURE

A sultone is recovered from a mixture consisting essentially of a sultone and an alkenesulfonic acid by dissolving the mixture in a solution consisting essentially of a lower alcohol plus water or a ketone plus water, cooling the resulting second solution to precipitate the sultone, and separating the precipitated sultone from the mother liquor, as by filtration or centrifugation.

Concurrently filed application No. 139,908, filed on May 3, 1971, entitled "Recovery of Sultones," of which Butler and Krehbiel are the applicants, relates to the instant application in that an alternative method of recovering a sultone from a mixture consisting essentially of a sultone and an alkenesulfonic acid is disclosed and claimed wherein the mixture consisting essentially of a sultone and an alkenesulfonic acid is dissolved in a liquid alkane, the resulting solution is cooled to precipitate the sultone, and the precipitated sultone is separated from the mother liquor, as by filtration or centrifugation.

Concurrently filed application No. 139,909, filed on May 3, 1971, entitled "Production of Delta-Sultones by Isomerization of Alkenesulfonic Acids," relates to the instant application in that an improvement thereon is disclosed and claimed whereby a mother liquor from the instant application which contains alkenesulfonic acids is heated to distill the liquid alkane therefrom and to isomerize the alkenesulfonic acids therein into an isomerization mixture comprising a delta-sultone and alkenesulfonic acids.

BACKGROUND OF THE INVENTION

This invention relates to a method for recovery of sultones.

Sultones are valuable chemical compositions. Sultones can be hydrolyzed to hydroxyalkanesulfonic acids. Such hydroxyalkanesulfonic acids are readily converted to analogous sodium or potassium hydroxyalkanesulfonates which are valuable detergents. Such alkali metal hydroxyalkanesulfonates are particularly valuable as detergents in that they are little affected by hardness in water.

Materials having good hard water detersive properties are currently much sought after because of growing environmental concern over the effects of phosphates often conventionally used in detergent formulations to improve the hard water performance of many currently used detergents. Therefore, technical advances which improve the availability and lower the cost of alkali metal hydroxyalkanesulfonates have substantial importance. This invention has importance in that a novel and improved method for separating sultone precursors to desirable hydroxyalkanesulfonate detergents is disclosed.

OBJECTS OF THE INVENTION

An object of this invention is to recover a sultone from a mixture consisting essentially of a sultone and an alkenesulfonic acid.

This and other objects and advantages will appear from the following description of the embodiments of the invention, and the most novel features will be particularly pointed out hereinafter in connection with the appended claims.

SUMMARY OF THE INVENTION

In one aspect, this invention discloses a method for recovering a sultone from a mixture consisting essentially of a sultone and an alkenesulfonic acid comprising dissolving the mixture in a solution consisting essentially of a lower alcohol plus water or a ketone plus water, cooling the resulting solution to precipitate the sultone, and separating the sultone from the liquid filtrate.

DESCRIPTION OF THE PREFERRED EMBODIMENTS

The mixtures consisting essentially of a sultone and an alkenesulfonic acid from which sultones are recovered according to the process of this invention generally contain in the range of about 5 to 95 percent by weight of a sultone which can be represented as follows:

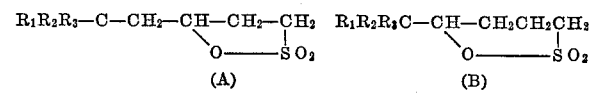

wherein $R_1$ is an alkyl radical, and wherein $R_2$ and $R_3$ are alkyl or hydrogen. The materials represented by structure A above are gamma-sultones, and the materials represented by structure B above are delta-sultones. Such gamma-sultones and delta-sultones generally contain in the range of about 10 to 20 carbon atoms per molecule. Mixtures of such sultones can be present.

The mixtures consisting essentially of a sultone and an alkenesulfonic acid which are separated according to the process of the instant invention can also comprise in the range of about 5 to 95 weight percent of an alkenesulfonic acid represented by the following structures:

$$R_1R_2R_3C-CH_2-CH_2CH=CHSO_3H$$
(I)

$$R_1R_2R_3C-CH_2-CH=CH-CH_2SO_3H$$
(II)

$$R_1R_2R_3C-CH=CH-CH_2CH_2SO_3H$$
(III)

wherein $R_1$, $R_2$ and $R_3$ are as defined above. The materials represented by structure I are alpha-alkenesulfonic acids, and the materials represented by structure II are beta-alkenesulfonic acids, and the materials represented by structure III are gamma-alkenesulfonic acids. Often, a preponderance of beta-alkenesulfonic acids is present. Minor amounts of delta, epsilon, and other alkenesulfonic acids can also be present. Such alkenesulfonic acids generally have in the range of about 10 to 20 carbon atoms per molecule. Mixtures of position isomers are often present, and mixtures of alkenesulfonic acids of differing chain length can also be present.

Examples of some delta-sultones and gamma-sultones which can be present in the mixtures to be separated include the following:

gamma-decanesultone
gamma-eicosanesultone
delta-decanesultone
delta-eicosanesultone
gamma-hexadecanesultone
delta-hexadecanesultone
5-methyl-delta-pentadecanesultone
5,5-dimethyl-gamma-octadecanesultone
and the like.

Examples of some alkenesulfonic acids which can be present in mixtures to be separated according to the process of this invention include the following:

1-decanesulfonic acid
1-eicosenesulfonic acid
2-decenesulfonic acid
2-eicosenesulfonic acid
1-hexadecenesulfonic acid
2-hexadecenesulfonic acid
5-methyl-1-pentadecenesulfonic acid
5,5-dimethyl-2-octadecenesulfonic acid
3-decenesulfonic acid
4-decenesulfonic acid
3-eicosenesulfonic acid
4-eicosenesulfonic acid and the like.

The lower alcohol employed according to the process of this invention can contain about 1 to 4 carbon atoms. Examples of suitable alcohols include: methanol, ethanol, propanol, 2-propanol, 2-butanol, 2-methyl-2-propanol, 2-methyl-1-propanol, and the like.

The ketone employed according to the process of this invention can generally have in the range of about 3 to 5 carbon atoms per molecule. Examples of suitable ketones include acetone, methyl ethyl ketone, 3-pentanone, and the like.

Mixtures of suitable alcohols, mixtures of suitable ketones, and mixtures of suitable alcohols and ketones can be employed.

The solutions of this invention which consist essentially of a lower alcohol plus water can contain in the range of about 10 to 90 percent by weight water. Such solutions can contain in the range of about 10 to 90 percent by weight of lower alcohol.

The solutions of this invention which consist essentially of a ketone plus water can contain about 10 to 90 weight percent of ketone. Such solutions can contain in the range of 10 to 90 percent by weight of water.

In general, sufficient solution (consisting essentially of a lower alcohol plus water or a ketone plus water) to completely dissolve the mixture consisting essentially of a sultone and an alkenesulfonic acid at temperatures at least about 10° C. higher than the point of precipitation of sultones therefrom, but below the lower of the boiling point of the solution consisting essentially of a lower alcohol plus water or a ketone plus water or the degradation temperature of the sultone, are employed. In general, in the range of about 5 to 30 parts by weight of solution consisting essentially of a lower alcohol plus water per part by weight of a mixture consisting essentially of a sultone and an alkenesulfonic acid are often employed. Also, in general, in the range of about 5 to 30 parts by weight of a solution consisting essentially of a ketone plus water per part by weight of mixture consisting essentially of a sultone and an alkenesulfonic acid are often employed. Temperatures in the range of about 20 to 90° C. are often preferably employed. Preferably, to promote a maximum of efficiency, often a minimum amount of solution (consisting essentially of a lower alcohol plus water or solution containing a ketone plus water) necessary to completely dissolve the sultone and alkenesulfonic acid is employed at a temperature only a few degrees below the boiling point (of the solution consisting essentially of a lower alcohol plus water or a solution consisting essentially of a ketone plus water).

Upon dissolving the mixture consisting essentially of a sultone and an alkenesulfonic acid in the solution consisting essentially of a lower alcohol plus water or the solution consisting essentially of a ketone plus water, the resulting solution is cooled according to the process of this invention to precipitate the sultone. Such cooling is sufficient to precipitate the sultone, but not so great that other materials began precipitating. In general, the solution is often cooled to temperatures in the range of about −10 to 20° C.

Upon precipitation of the sultones, according to the process of this invention, the sultones which are precipitated are separated from the liquid filtrate. Such separation can be accomplished by any means known to the art for separating a solid material from a liquid. Often, such separation is conveniently effected by filtration or by centrifugation, techniques which are well known to the art.

The solution consisting essentially of a lower alcohol plus water or the solution consisting essentially of a ketone plus water, or components thereof can readily be separated from the filtrate, as by distillation or the like, and recycled if desired.

The process of this invention is often advantageously employed to separate gamma-sultones from a mixture comprising gamma-sultones and alkenesulfonic acids which is formed by the reaction of $SO_3$ with 1-alkenes according to the following representation:

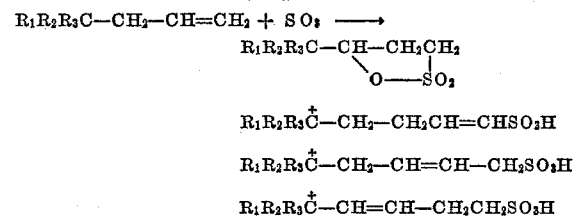

wherein $R_1$, $R_2$, and $R_3$ are as defined above. Reaction of $SO_3$ and such 1-alkenes to form mixtures consisting essentially of a gamma-sultone and an alkenesulfonic acid is well known to the art.

The method of this invention is also most advantageously employed to separate delta-sultones from the mixture consisting essentially of a delta-sultone and alkenesulfonic acids which is prepared by isomerizing the gamma-sultones in a mixture prepared by reacting $SO_3$ and 1-alkenes to gamma-sultones by the application of heat. Such isomerization of gamma-sultones to delta-sultones within mixtures formed by the reaction of $SO_3$ and 1-alkenes is well known to those skilled in the art.

The following examples are given to further illustrate some aspects of this invention, but are not to be considered limiting.

EXAMPLE 1

A 1-hexadecene sulfonation product was prepared in a continuous sulfonation unit by charging 1-hexadecene at the rate of 6.6 g./hr. (8.4 ml./hr.), and $SO_3$ at the rate of 1.5 g./hr. to 2.7 g./hr. at a temperature of 40-60° C., and continuously withdrawing the sulfonation product as made. The 1-hexadecene sulfonation product thus prepared was immediately cooled to about 0° C. to prevent isomerization of the gamma-sultone to the analogous delta-sultone.

Ten grams of the 1-hexadecene sulfonation product thus prepared was analyzed and found to contain approximately six grams gamma-hexadecanesultone and approximately four grams of hexadecenesulfonic acids (largely beta isomers).

Another 10 gram portion of the sulfonation product was added to a solution containing 90 percent by weight of methanol and 10 percent by weight of water at a temperature of about 25° C. The sulfonation product was dissolved therein.

The resulting solution was cooled to about 4° C. and filtered. Approximately 4 grams of gamma-hexadecanesultone was recovered on the filter. The hexadecene-sulfonic acids remained in solution.

The first run of this example was repeated except that larger proportions of water were employed in the solution consisting essentially of methanol plus water. Similar results were obtained, except that as the proportion of water was increased, a greater proportion of the sultones present was recovered, but hexadecenesulfonic acid was also precipitated in greater quantities with greater proportions of water, producing a gummy solid instead of the white crystals of gamma-hexadecanesultone as a precipitate.

Runs were also conducted similar to the first run of this example except that the proportion of water in the solution consisting essentially of methanol and water was decreased. Similar results were obtained, but it was noted that as the proportion of water in the solution consisting essentially of methanol and water was decreased, less sultone was recovered.

EXAMPLE 2

A sulfonation product of 1-hexadecene was prepared as in Example 1.

Ten grams of the 1-hexadecene sulfonation product were dissolved in a solution containing 50% by weight of methyl ethyl ketone and 50% by weight of water at a temperature of about 25° C.

The resulting solution was cooled to about 4° C. A precipitate formed. The mixture was then filtered.

About 4.2 grams of gamma-hexadecanesultone were recovered. The hexadecenesulfonic acids remained in solution.

The first run of this example was repeated except that larger proportions of water were employed in the solution consisting essentially of methyl ethyl ketone and water in a series of runs. Similar results were obtained, but it was noted that as the proportion of water in the solution consisting essentially of methyl ethyl ketone and water was increased, more sultone was recovered, but larger quantities of sulfonic acid were also recovered yielding a gummy solid instead of the white crystals of pure gamma-hexadecanesultone recovered in Run 1 of this example.

Another series of runs were completed wherein the proportion of water employed in the solution consisting essentially of methyl ethyl ketone and water, but wherein the runs otherwise like the first run of this example. It was observed that as less water was employed in the solution consisting essentially of methyl ethyl ketone and water, less sultone was recovered.

EXAMPLE 3

The 1-hexadecene sulfonation product prepared in Example 1 is heated to 80° C. for two days to isomerize the gamma-hexadecanesultone therein to delta-hexadecanesultone.

The resulting isomerization product is employed in lieu of the 1-hexadecene sulfonation product employed in the runs of Examples 1 and 2, but wherein other parameters of the runs are the same. Similar results are obtained, except that delta-hexadecane sultone is recovered rather than gamma-hexadecane sultone as in Examples 1 and 2.

EXAMPLE 4

The runs of Examples 1, 2 and 3, are repeated except that 2-propanol is employed in lieu of methanol and acetone is employed in lieu of methyl ethyl ketone. Similar results are obtained.

We claim:

1. A method for recovering a sultone of the formula:

$$R_1R_2R_3-C-CH_2-CH-CH_2-CH_2 \quad R_1R_2R_3C-CH-CH_2CH_2CH_2$$
$$\underset{O-----SO_2}{\diagdown} \qquad \underset{O-----SO_2}{\diagdown}$$

wherein $R_1$ is alkyl, wherein $R_2$ and $R_3$ are alkyl or hydrogen, and wherein each molecule of sultone has 10 to 20 carbon atoms from a mixture consisting essentially of the sultone and an alkene sulfonic acid of the formulae:

$$R_1R_2R_3C-CH_2-CH_2CH=CHSO_3H$$
$$R_1R_2R_3C-CH_2-CH=CH-CH_2SO_3H$$

or $$R_1R_2R_3C-CH-CH=CH-CH_2CH_2SO_3H$$

wherein $R_1$, $R_2$, and $R_3$ are as defined heretofore, and wherein each molecule of alkene sulfonic acid has 10 to 20 carbon atoms, the method comprising dissolving the mixture in a first solution consisting essentially of an alkanol of 1 to 4 carbon atoms plus water or a ketone having 3 to 5 carbon atoms plus water, about 10 to 90 parts by weight of alkanol or ketone are present for each part by weight of water in the first solution, to form a second liquid solution, cooling the second liquid solution, to a temperature of about $-10°$ C. to about $20°$ C. whereby the sultone is precipitated without the precipitation of any other material, and separating the sultone from the liquid filtrate by filtration or centrifugation.

2. The method of claim 1 wherein the mixture consisting essentially of a gamma-sultone and an alkenesulfonic acid is a reaction product formed by reacting $SO_3$ with a 1-alkene.

3. The method of claim 1 wherein the mixture consists essentially of a delta-sultone and an alkenesulfonic acid.

4. The method of claim 3 wherein the mixture consisting essentially of a delta-sultone and an alkene-sulfonic acid is a reaction product formed by reacting $SO_3$ with a 1-alkene and thence isomerizing the gamma-sultone in the reaction product thereof to a delta-sultone by the application of sufficient heat to isomerize the gamma-sultone to the delta-sultone, said heat not being of sufficient intensity to cause degradation of the alkenesulfonic acid, the delta-sultone, or the gamma-sultone, and at a pressure sufficient to prevent volatilization of the gamma-sultone, the delta-sultone, or the alkenesulfonic acid.

References Cited
UNITED STATES PATENTS 3,579,537    5/1971    Rubinfeld et al. ___ 260—327 S

OTHER REFERENCES

Fette et al., "Anstrichmittel," vol. 72, pp. 247–253 (1970).

HENRY R. JILES, Primary Examiner

R. T. BOND, Assistant Examiner

U.S. Cl. X.R.

260—513 R